US008668878B2

(12) United States Patent
Kubicek et al.

(10) Patent No.: US 8,668,878 B2
(45) Date of Patent: Mar. 11, 2014

(54) REACTION VESSEL FOR CRYSTALLIZING A SAMPLE FROM A SOLUTION

(75) Inventors: Johann Kubicek, Cologne (DE); Bert Jungheim, Solingen (DE); Rainer Dahlke, Kaarst (DE)

(73) Assignee: Qiagen GmbH, Hilden (DE)

( * ) Notice: Subject to any disclaimer, the term of this patent is extended or adjusted under 35 U.S.C. 154(b) by 0 days.

(21) Appl. No.: 13/063,130

(22) PCT Filed: Sep. 8, 2009

(86) PCT No.: PCT/EP2009/061601
§ 371 (c)(1),
(2), (4) Date: May 23, 2011

(87) PCT Pub. No.: WO2010/029060
PCT Pub. Date: Mar. 18, 2010

(65) Prior Publication Data

US 2011/0229381 A1 Sep. 22, 2011
US 2012/0219472 A2 Aug. 30, 2012

(30) Foreign Application Priority Data

Sep. 10, 2008 (DE) ........................ 10 2008 046 668

(51) Int. Cl.
*B01D 9/02* (2006.01)

(52) U.S. Cl.
USPC ........................................ 422/245.1; 422/503

(58) Field of Classification Search
USPC ............................................... 422/503, 245.1
See application file for complete search history.

(56) References Cited

U.S. PATENT DOCUMENTS

2002/0141905 A1 10/2002 Sha et al.
2003/0010278 A1 * 1/2003 Newman ......................... 117/68

FOREIGN PATENT DOCUMENTS

WO WO 00/14311 3/2000
WO WO 2004/064976 A2 8/2004

* cited by examiner

*Primary Examiner* — Natalia Levkovich
(74) *Attorney, Agent, or Firm* — Fanelli Haag & Kliger PLLC

(57) ABSTRACT

The present invention relates to a reaction vessel for crystallization of a sample from a solution and a covering foil and an arrangement for mounting the covering foil.

10 Claims, 6 Drawing Sheets

REACTION VESSEL FOR CRYSTALLIZING A SAMPLE FROM A SOLUTION

This application is a National Stage of PCT/EP2009/061601, filed Sep. 8, 2009 which claims priority to German Application No. 10 2008 046 668.9, filed Sept. 10, 2008, the disclosures of which are incorporated herein by reference in their entireties.

FIELD OF THE INVENTION

The present invention relates to a reaction vessel for crystallization of a sample from a solution and a cover foil for a reaction vessel and an arrangement for mounting the cover foil.

TECHNICAL BACKGROUND

The manufacture of crystals of biological macromolecules such as proteins and nucleic acids represents a critical factor in the structure ellucidation of these molecules. An important method of crystallization is based on the process of vapor diffusion. In this process, a small sample of the macromolecule dissolved in a crystallization solvent is enclosed in a reaction vessel together with a separate quantity of the solvent. By vapor diffusion between the sample dissolved in the crystallization solvent and the solvent in a reservoir, a supersaturation of the sample solution and a crystallization of the sample can be performed.

Since the crystal growth of macromolecules is dependent on different parameters, it is often necessary to perform several crystallization growth attempts in parallel to the greatest extent possible, in order to test out suitable parameters. This is customarily done on microtiter plates or microwell plates. These are also called crystallization plates when they are used for crystallization.

Microtiter or crystallization plates of this type are known from the state of the art. The individual reaction chambers of a microtiter plate can be closed in order to create a closed gas chamber depending on the design of the plate, for example, by a cover or a foil.

In the state of the art, different alternative microtiter plates for the crystallization of macromolecules are known. For example, the document EP 1 397 201 A1 discloses a reaction vessel for manufacturing a sample having several reaction chambers which each have a reservoir and several reaction areas.

It is disadvantageous in these reaction vessels that the individual reaction chambers can not be sealed so that they are air-tight and can not make a separate sealed-off gas chamber. In particular, in crystallization plates with many reaction chambers and correspondingly small volumes, evaporation of the solvents from the reaction vessels is a frequently occurring disadvantage.

When a foil is used to cover reaction vessels of this type, the foil above the corresponding reaction chamber is usually cut open in order to remove the crystal that has formed from the reaction vessel. In the process, it is disadvantageous that during this type of cutting the covering of surrounding reaction chambers is frequently also damaged so that these crystallization attempts are then no longer sealed off so that they are air-tight and thus can not be used.

The object of the present invention is thus to provide a means that overcomes at least one of the aforementioned disadvantages of the state of the art. In particular, it is the purpose of the present invention to provide a means that makes possible a better sealing capability of a reaction vessel.

The object is achieved by a reaction vessel as described herein. For example, a reaction vessel for crystallization of a sample from a solution is provided comprising several reaction chambers, wherein each reaction chamber has a reservoir and at least one crystallization space, wherein a first side wall of a first reaction chamber (2' in FIG, 2) is connected at a spacer distance (200 in FIG. 2) via a connection spacer to a second side wall of a second reaction chamber (2" in FIG. 2), wherein the connection spacer is arranged on a shared plane with the sideways circumferential surface of the reaction vessel and the plane forms a flat planar surface (202 in FIG. 2) of the reaction vessel.

Surprisingly it was discovered that the reaction vessel according to the invention can provide an improved covering of the individual reaction chambers of the reaction vessel.

In an advantageous way, the formation of connection spacers between the reaction chambers, wherein a first side wall of a first reaction chamber is connected spaced at a distance to a second side wall of a second reaction chamber via a connection spacer, and wherein the connection spacers form a planar surface with the sideways circumferential surface of the reaction vessel, can lead to the possibility of making wider spacers. In particular, this can be made possible in that adjacent reaction vessels do not have any shared vessel walls so that adjacent reaction chambers can be set apart at a distance from each other by wider spacers. In an advantageous way, wider spacers can make possible wider adhesion areas for an adhesive covering foil or for applying adhesive. In this way, the sealing capability of the reaction chambers can be considerably improved.

This is especially advantageous compared to the customary thin intermediate spacers between reaction chambers which only have a very small adhesive surface for a foil.

It is further advantageous that by the connection spacers forming a planar surface with the sideways circumferential surface of the reaction vessel, a good sealing capacity of the individual reaction chambers, in particular by a covering foil, is further increased. Non-planar areas of the surface, for example, made by narrow intermediate webs which extend out from the surface of the edge areas or lie beneath it, are thus avoided according to the invention and thus also the sealing capacity of the reaction chambers is further improved.

It is of particular advantage also that wider adhesion areas can completely or almost completely prevent an evaporation of the solutions in the individual reaction chambers. This is especially of advantage for crystallization plates with many reaction chambers for example, so-called 96 well plates and correspondingly small volumes of solutions.

After closing the individual reaction chambers, for example, by a covering foil, they each form a separate gas chamber in which the sample dissolved in a solvent is enclosed on or in a crystallization space with additional solvent in a reservoir of the reaction chamber. Reducing or even preventing the evaporation of the solvent from out of the reaction chamber can lead, in particular for a small volume of the solvent, to the concentration of the solutions used for crystallization not being changed by an evaporation of the solvent. Correspondingly for an evaluation of the crystallization growth attempts, the concentration of a crystal required for crystallization can be clearly better estimated. This is especially advantageous for frequently used volatile solvents like alcohols and acids.

According to a preferred embodiment of the reaction vessel, the connection spacers have a width in the range of ≥1.5 mm to ≤5 mm, especially in the range of ≥2 mm to ≤4 mm, preferably in the range of ≥2.5 mm to ≤3 mm, more preferably in the range of ≥2.7 mm to ≤2.8 mm.

The specification of surface areas, widths, lengths or depths in the form of areas within the present invention is, unless otherwise noted, to be understood such that the lower limit specifies the minimum value and the upper limit specifies the maximum value.

It is advantageous that a planar surface and wide connection spacers can provide a sufficient surface area around the individual reaction chambers which is suitable for securely sealing off the individual reaction chambers with a covering foil. In the process, a self-sealing covering foil can be used or the surface area of the connection spacers and the edge area of the reaction vessel can be provided with adhesive. In particular, a planar surface and a wide connection spacer can provide a sufficient surface area around the individual reaction chambers which is suitable for attaching a self-adhesive covering foil securely around the reaction chamber.

According to a preferred embodiment of the reaction vessel according to the invention, the connection spacers have a groove. This groove is preferably arranged centrally, i.e. symmetrically, on the connection spacer between the two upper edges of the side walls of adjacent reaction chambers. However, it is also conceivable that the groove is arranged asymmetrically between the upper edges of the side walls of two adjacent reaction chambers. In this case, the separation distance of the upper edge of the side wall of a reaction chamber from the groove would not be identical to the separation distance of the upper edge of the side wall of the adjacent reaction chamber. Preferably, the connection spacers have a groove in the center.

"Groove" in the context of the present invention is understood to be a longitudinal or flute-shaped depth, preferably a groove An advantage of the groove is that it can provide a defined cutting guide.

After a successful crystallization, the foil that seals a reaction chamber is partially or completely opened or cut open in the usual way with a scalpel or another cutting tool in order to provide access to the crystal that has formed. It is especially advantageous for a groove in the connection spacers that when the foil is cut open along the grooves the surface of the foil can be safely removed above a specific reaction chamber. Until now, the removal of the surfaces of the foil above a reaction chamber was usually done by cutting the foil along the spacers which separate two adjacent reaction chambers or along the upper inside wall of the reaction chamber. By accidental sliding of the cutting tool during a cutting operation, damages to the surrounding reaction chambers frequently can occur. However, by the groove described above, the accidental sliding of the cutting tool and thus the damage of the covering of the surrounding reaction chambers by the cutting tool is prevented such that the surrounding crystallization growth attempts are not impaired.

Most especially preferred, the reaction vessel has a circumferential groove along the outsides of the reaction chambers. However, it is also conceivable that the groove does not completely surround the reaction chamber, but only is arranged on at least one side of the reaction chamber, preferably on two sides, further preferred on three sides. Preferably, starting from the depth of the reaction chamber, the width of the surface area of the spacer up to the circumferential groove corresponds to the width of the connection spacer up to the groove arranged in the center of the connection spacers. In preferred embodiments, the reaction chambers are surrounded with spacers with widths that correspond to each other. Preferably, the inner areas of the spacers are surrounded by grooves.

The areas of the spacers surrounded by grooves have the advantage that a defined portion of the covering foil can be cut along the groove and this foil piece can be safely lifted out to the top.

Preferably, the spacers have an area in the range from $\geq$24.75 $mm^2$ to $\leq$65 $mm^2$ per reaction chamber, preferably in the range from $\geq$32 $mm^2$ to $\leq$56 $mm^2$ per reaction chamber, preferably in the range from $\geq$38.75 $mm^2$ to $\leq$45 $mm^2$ per reaction chamber. The term "spacer" indicates here both the connection spacers and, in the case of the reaction vessels on the outside, the spacers which are formed on the sides of reaction vessels on the outside by the edge area of the reaction vessel. Preferably the surface area of the spacers for each reaction chamber defines the surface surrounding the respective reaction chamber which is defined by the groove running along the sides of the reaction chamber.

Furthermore, it is advantageous that the surface area of the connection spacers provides enough adhesive area on both sides of the groove so that after the removal of the foil over the reaction chamber, the attachment of the foil over the adjacent reaction chamber is not damaged.

The groove can have a semi-circular or convex cross-section, a right-angled cross-section, a triangular cross-section or preferably a trapezoid shape having equal legs with a wall inclined outward. Preferably, the groove has walls that are inclined to the outside. This can, in an advantageous way, make it easier to guide a cutting tool such as a scalpel. Preferably, the groove has walls that are angled to the outside which meet in the center.

According to a preferred embodiment of the reaction vessel according to the invention, the groove has a width in the range from $\geq$0.2 mm to $\leq$0.7 mm, especially in the range of $\geq$0.3 mm to $\leq$0.6 mm, preferably in the range of $\geq$0.4 mm to $\leq$0.5 mm.

According to another preferred embodiment of the reaction vessel, the groove has a depth (210 in FIG. 2) in the range from >0.05 mm to <0.5 mm, especially in the range of >0.1 mm to <0.4 mm, preferably in the range of >0,2 mm to <0.3 mm.

This can, in an advantageous way, make it easier to guide a cutting tool such as a scalpel.

According to another preferred embodiment of the reaction vessel according to the invention, the connection spacers have a recess in at least one area of the edge of a reaction vessel, which preferably is not in contact with the edge of an adjacent reaction chamber, and preferably in at least one corner of a reaction chamber. According to a further preferred embodiment of the reaction vessel according to the invention, the spacers have a recess on the outside of the reaction chamber on at least one area, preferably on at least one corner of a reaction chamber.

Preferably the connection spacers have a recess at one position, preferably at one corner of a reaction chamber. It can further be provided that the connection spacers have a recess at two, three, or four positions, preferably corners of a reaction chamber. Preferably the at least one recess is arranged on the side of the reaction chamber on which the crystallization space is arranged.

Preferably, the connection spacers have a recess starting from the groove arranged in the connection spacer. Furthermore, the connection spacers have recesses preferably starting from a intersection area of the grooves.

According to an additional preferred embodiment of the reaction vessel according to the invention, the spacers have, on the outside of the reaction chambers starting from the groove arranged on the circumference and on at least one position, a recess preferably on one corner of a reaction chamber.

In an advantageous way, the recesses make it possible for a cutting tool to get into the recess and this makes easier the removal of a foil.

In additional preferred embodiments, the recesses have a depth which corresponds to the depth of the groove. Preferably the recesses have a depth in the range from ≥0.05 mm to ≤0.5 mm, especially in the range of ≥0.1 mm to ≤0.4 mm, preferably in the range of ≥0.2 mm to ≤0.3 mm.

Preferably, the recesses have an area in the range from ≥0.4 $mm^2$ to ≤1.2 $mm^2$, preferably in the range from 0.5 $mm^2$ to ≤1 $mm^2$, preferably in the range from ≥0.65 $mm^2$ to ≤0.9 $mm^2$.

The recess has the advantage that when lifting off the covering foil, a cutting tool can be guided on the corner of the reaction chamber under the foil piece that can be cut out along the groove. This measure has the additional advantage that a cut-out foil piece, which could have a desired crystal on its side that faces the reaction chamber, can be removed without damage to the foil piece and the crystal.

The reaction vessel according to the invention comprises several reaction chambers wherein each reaction chamber has a reservoir and at least one crystallization space. After uncovering, each reaction chamber can form its own gas chamber, wherein the reservoir and the crystallization space are able to exchange gas with each other.

Preferably the reaction vessel according to the invention has a format according to the dimensions of the Recommendation of the Society of Biomolecular Screening (SBS) preferably according to ANSI/SBS-standards. Standards such as those of the Society of Biomolecular Screening (SBS; www.sbsobline.org) are known to the expert.

These measures have the advantage that crystallization growth attempts in the reaction vessel according to the invention can be performed with the aid of standardized pipetting aids and robot systems.

Furthermore, the reaction vessel according to the invention preferably has, according to the SBS-standard, a number of reaction chambers according to the formula $3\times2^N$, where N is a natural number. For example, the reaction chambers of a 96-well reaction vessel are arranged according to the SBS-standard in eight rows of 12 each, which are each 9 mm apart from each other.

The reservoir is preferably an essentially rectangular cavity which has in preferred embodiments a depth in the range of ≥8 mm to ≤12 mm, especially in the range of ≥9.5 mm to ≤10.5 mm, preferably in the range of ≥9.9 mm to ≤10.1 mm, wherein the depth is determined starting from the planar surface of the reaction vessel to the floor of the cavity.

In preferred embodiments, the reservoir has a width in the range of ≥1.7 mm to ≤3.5 mm, especially in the range of ≥2 mm to ≤3.2 mm, preferably in the range of ≥2.2 mm to ≤3.0 mm, and/or a length in the range from ≥4 mm to ≤7.5 mm, especially in the range of ≥5 mm to ≤7 mm, preferably in the range of ≥5.6 mm to ≤6.2 mm.

Preferably the volume of the reservoir is less than in customary crystallization plates. In a preferred embodiment, the reservoir has a volume in the range from ≥70 μl to ≤160 μl, especially in the range from ≥80 μl to ≤150 μl, preferably in the range of ≥130 μl to ≤140 μl.

The specified "volume of the reservoir" in the context of the present application is understood to be the volume of the reservoir from the floor (204 in FIG. 2) of the reservoir to the height of the ledge (206 in FIG. 2) for the crystallization space.

Preferably, the reservoir has rounded corners. More preferably, the reaction chamber has rounded corners.

It is especially advantageous that when the corners are rounded, liquid, in particular the crystallization solvent, does not rise or rises in a clearly reduced amount. In particular, a combination of rounded off corners of the reservoir and rounded off corners of the reaction chamber have proven to be favorable.

Preferably the at least one crystallization space is arranged on a ledge in the reaction chamber. It is preferred that the at least one crystallization space is constructed as a recess. The ledge (206 in FIG. 2) formed between an internal surface (212 FIG. 2) of the first sidewall (8) and an external surface (208 in FIG. 2) of the first sidewall (8) has, in a preferred embodiment, a smooth surface on the underside beneath the crystallization space.

Preferably the ledge in the reaction chamber, on which the at least one crystallization space is arranged is arranged at a height in the range from ≥7 mm to ≤10 mm, preferably in the range from ≥8 mm to ≤9 mm above the vessel bottom of the reservoir.

Each reaction chamber has a reservoir and at least one crystallization space. The reaction chamber can have several crystallization spaces, for example, two or three crystallization spaces, but it is preferred that the reaction chamber has one crystallization space.

An additional advantage of the reaction vessel according to the invention can be provided by the volume of one crystallization space being increased compared to a number of crystallization spaces.

In a preferred embodiment, the volume in particular of the recess of the crystallization space can be in the range from ≥10 nl to ≤7 μl, preferably in the range from ≥50 nl to ≤5 μl, more preferably in the range of ≥100 nl to ≤1 μl, especially in the range of ≥300 nl to ≤500 nl.

An increased volume of the crystallization space can have the advantage that a sample dissolved in a crystallization solvent can be pipetted not only automatically but also better manually.

Preferably the recess that forms the floor of the crystallization space has a curved or spherical surface, preferably a concave surface that is arched to the inside.

According to a preferred embodiment the crystallization space has an oval preferably elliptical or essentially elliptical shape. According to an especially preferred embodiment of the reaction vessel, the crystallization space is shaped elliptically or essentially elliptically.

The term "elliptically shaped" in the context of the present invention has the meaning that the crystallization space has an elliptical outline in overhead view such that the longer axis of the ellipsoid preferably extends parallel to the longer axis of the reservoir.

Preferably the crystallization space, in particular the recess that forms the crystallization space, has the shape of a half oval and preferably a half-ellipsoid.

According to an additional embodiment, the crystallization space that is shaped elliptically or essentially has an elliptical shape, in particular the recess that forms the crystallization space has a width in the range from ≥1.5 mm to ≤4 mm, preferably in the range from ≥1.8 mm to ≤3.5 mm, preferably in the range of ≥2.1 mm to ≤3.0 mm, and/or a length in the range from ≥4.5 mm to ≤8 mm, preferably in the range from ≥5.1 mm to ≤7 mm, preferably in the range of ≥5.6 mm to ≤6.2 mm.

The advantage of a curved, in particular, elliptical surface of the crystallization space lies especially in the fact that a reproducible positioning of the sample droplet is made possible. This can result in a reproducible positioning of the crystal to be formed. For example, the crystal will form preferably in the deepest area of the curvature. In an advantageous way, the crystal can thus form in the center or almost in the center in the crystallization space.

Advantages thus result in particular from the reproducible positioning of the dissolved sample, whereby a reproducible positioning of the crystals can be obtained.

In particular, by a rounded off surface, preferably an elliptically shaped surface, of the crystallization space it can be avoided that the crystal growth starts in corners whereby a removal of the crystal or an analysis of the crystal directly in the crystallization space would be made more difficult.

An oval and preferably elliptical design has, moreover, the special advantage that a removal of the crystals is made easier in that a device for removal of the crystal, for example a customary so-called crystallization loop, a metal pin with a loop on the end, is guided through the shape of the crystallization space in the direction of the deepest area. Thus, the essentially elliptical shape of the crystallization space makes possible an easier isolation of the crystal that is formed.

Furthermore, a curved surface of the crystallization space, in particular an oval or preferably elliptical shape, can have the additional large advantage of preventing a reflection, in particular a total reflection, of the light, which for example is used for illumination for microscope examination of crystals that have formed in the reaction vessel, as frequently occurs on flat surfaces. In this way, a microscopic examination in the reaction chamber can be considerably made easier.

Preferably the reaction vessel is designed from a light-permeable polymer. In this way, the crystallization growth attempts can be examined without opening using light-optical instruments.

Preferred polymers are selected from the group comprising polypropylene, polystyrene, acryl butadiene styrene, polycarbonate, polymethyl methacrylate, polysulfone, cycloolefin-copolymer (COC), cycloolefin-polymer (COP), polymethyl pentene and/or acryl ester-styrene acrylnitrile.

It is advantageous that these polymers are resistant to organic solvents such as acetone, benzene or acetonitrile which are frequently used for crystallization. Furthermore, they are compatible with different frequently used salts, buffers or polymers which are used for crystallization.

Especially preferred polymers are selected from the group comprising cycloolefin-copolymers and/or cycloolefin-polymers, preferably cycloolefin-copolymers. A reaction vessel, in particular designed from a cycloolefin-copolymer can provide an especially good transparency. Furthermore, vessels made from cycloolefin-copolymers are less permeable to water vapor and thus are less sensitive for evaporation than vessels made for example from polystyrene.

Preferred cycloolefin-copolymers have, at room temperature of 23° C., a water absorption of less than 0.01%. Further preferred, cycloolefin-copolymers can be used which have a light permeability in the wavelength range of 280 nm of ≥90% to ≤100%, preferably 91%.

Preferred cycloolefin-copolymers can be obtained for example under the trade name Topas®, in particular Topas® 8007X10, of the company Topas Advanced Polymers. Preferred cycloolefin polymers (COP) are obtainable, for example, under the trade name ZEONOR®.

The reaction vessel according to the invention is suitable for the crystallization according to the "sitting drop" procedure, of a sample from a solution comprising several reaction chambers, wherein each reaction chamber has a reservoir and at least one crystallization space.

If a sample solution is applied to a cover of the reaction vessel, in particular directly above a reaction chamber, a crystallization can be performed according to the so-called "hanging drop" procedure.

According to a preferred embodiment of the reaction vessel, the reaction vessel can also have a vessel cover. According to a preferred embodiment, the vessel cover is an elastic cover foil. In general, however, the use of a rigid cover is also possible in this context. Preferably by attaching a cover foil or a rigid cover onto the reaction vessel, the reaction chambers can all be closed together.

An additional advantage of a cover foil is that also a part of the reaction chambers of the reaction vessel can be intentionally closed. In particular in the use of a cover foil it is advantageous that individual reaction chambers can be opened intentionally by removal of a partial piece of the cover foil without the surrounding reaction chambers necessarily being also opened. In particular, there is a small risk of contamination in cover foils. Furthermore, adhesive cover foils are simple to use.

It can also be provided that the spacers and edge areas of the reaction vessel are covered with adhesive and a cover foil can be applied that is not designed to be adhesive. However, it is preferred that an adhesive cover foil is applied. This has considerable advantages in the handling of the cover plate prior to being adhered.

Preferably, the cover foil is made from a light-permeable polymer. In this way, the crystallization growth attempts can be examined without opening using light-optical instruments.

Preferred polymers are elastomers, fluorinated and non-fluorinated polymers, in particular selected from the group comprising polyethylene, in particular, low-density polyethylene (LDPE) and high density polyethylene (HDPE), polypropylene, polyester, polystyrene, polyethylene terephthalate, fluoropolymers such as polyvinyl chloride (PVC), perfluoralkoxy-copolymer (PFA), ethylene chlorotrifluoroethylene copolymer (E-CTFE), ethylene tetrafluoroethylene copolymer (E-TFE), trifluorochloroethylene/ethylene copolymer (CTFE), polyvinylidine fluoride (PVDF), tetrafluoroethylene-hexafluoropropylene copolymer (FEP), polytetrafluoroethylene (PTFE), polyolefin, acryl polymer, acryl-copolymer, ethylene acrylate, ethylene methacrylate, ethylene methyl acrylate, ethylene methyl methacrylate copolymers, acrylnitrilstyrene copolymers, acrylnitril methylacrylate copolymers, ethylene vinyl acetate copolymers, butadiene styrene copolymers, polybutadiene, butadiene acrylonitrile copolymers, isobutylene isoprene copolymers, polycarbonates and/or cycloolefine polymers (COP).

Especially preferred polymers are selected from the group comprising polyethylene, polypropylene, polyester, polystyrene, polymethylmethacrylate, polyoxymethylene, polyethylene terephthalate, polyamide, fluoropolymers such as polyvinyl chloride (PVC), polycarbonate and/or cycloolefine-polymers (COP). An especially preferred polymer is polypropylene. In particular, a polypropylene layer can provide a good transparency of the cover foil.

Adhesive is preferably applied to the polymer layer.

Suitable adhesives are selected from the group comprising reactive adhesives and/or contact adhesives. Contact adhesives are preferred. As contact adhesives, contact adhesives customarily known in the state of the art can be used. Usable as contact adhesives are, for example, natural rubber, butyl rubber, styrene butadiene copolymers (SBR-rubber), acrylonitrile copolymers, polychloroprene, polyisobutylene, polybutadiene, polyisoprene, block copolymers, such as styrene isoprene, and styrene isoprene styrene (SIS) block copolymers or styrene butadiene styrene (SBS) block copolymers, polyesters, polyurethanes, silicones, polyvinyl ether, acrylonitrile copolymers, acrylates, methacrylates, ethylacrylates, ethyl methacrylates, propyl acrylates, propyl methacrylates, ethylacrylates, ethylmethacrylates, propylacrylates, propylmethacrylates, n-butylacrylates, n-butylmethacrylates, isobutylacrylates, 2-methylbutylacrylates, 2-ethylhexylacrylate, n-octylacrylates, isooctylacrylates, isooctylmethacrylates, isononylacrylates, isodecylacrylates, and copolymers of these acrylates.

Proven to be especially suitable as an adhesive and in particular a contact adhesive is an adhesive based on rubber, synthetic rubber or acrylate. According to a preferred embodiment, the contact adhesive is an acrylate adhesive. Preferred are acrylate adhesives based on (meth)acrylates selected from the group comprising methylacrylate, n-butylacrylate, tert.-butylacrylate, 2-ethylhexylacrylate, isooctylacrylate, isodecylacrylate, isobornylacrylate, and isobornylmethacrylate and/or ethylene acrylic acid copolymers.

Preferably, the covering foil is coated with an acrylate adhesive. The well-adhering acrylate adhesive can provide a reliable seal of the reaction chambers in an advantageous way. In particular, an interaction of the wide spacers according to the invention between the individual reaction chambers with a good adhering covering foil can significantly reduce the evaporation from the reaction chambers.

A surface above the individual reaction chambers can be provided free of adhesive. Here, no adhesive can be applied on the entire surface above the individual reaction chambers. This can allow a crystallization according to the "hanging drop" process without the sample solution being contaminated by adhesive.

Preferably, surfaces above the reaction areas are free of adhesive. The entire area above the reaction areas can be free of adhesive. Preferably only a part of the area above the reaction areas is free of adhesive. Statements about the position of the area here refer to the foil that is adhered to the reaction vessel.

According to an especially preferred embodiment, a covering foil for covering a reaction vessel comprising reaction chambers comprises a polymer layer on which an adhesive layer is applied, wherein preferably areas with a width in the range from ≥1.5 mm to ≤7.5 mm and a length in the range from ≥1.5 mm to ≤7.5 mm are designed to be non-adhesive within the adhesive layer.

This has, on the one hand, the advantage that the positioning of a droplet of the sample on the covering foil can be done with considerably greater certainty via the orientation to adhesive-free surfaces. On the other hand, it can be prevented by this that if the covering foil and/or the reaction vessel is shaken, the applied droplets run into each other and contaminate the adjacent growth attempts.

Preferably the covering foil has a number of non-adhesive areas according to the formula $3\times2^N$, where N is a natural number. It is preferred that the arrangement of the non-adhesive areas on the covering foil corresponds to the arrangement of the reaction chambers of a reaction vessel according to the SBS-standard where the non-adhesive areas are located in a suitable way on the surface of the covering foil inside of the cavity.

The non-adhesive areas are located preferably above the reservoir.

The non-adhesive areas can have a round, oval, especially an elliptical or essentially elliptical, or rectangular shape. In a preferred embodiment the non-adhesive area has a round shape.

In a preferred embodiment, the covering foil can have round areas with a diameter in the range from ≥1.5 mm to ≤7.5 mm, preferably in the range from ≥1.8 mm to ≤3 mm, especially in the range from ≥2 mm to ≤2.5 mm, which are non-adhesive.

In further preferred embodiments, the covering foil can have oval, in particular elliptical or essentially elliptical areas with a width in the range from ≥1.5 mm to ≤4 mm, preferably in the range from ≥1.8 mm to ≤3 mm, especially in the range from ≥2 mm to ≤2.5 mm, and/or a length in the range from ≥1.8 mm to ≤7.5 mm, preferably in the range from ≥2.5 mm to ≤6 mm, especially in the range from ≥2.5 mm to ≤3 mm, which are non-adhesive.

In likewise preferred embodiments, the covering foil can have rectangular areas with a width in the range from ≥1.5 mm to ≤7.5 mm, preferably in the range from ≥1.8 mm to ≤3 mm, especially in the range from ≥2 mm to ≤2.5 mm, and/or a length in the range from ≥1.5 mm to ≤7.5 mm, preferably in the range from ≥1.8 mm to ≤3 mm, especially in the range from ≥2 mm to ≤2.5 mm, which are non-adhesive.

In especially preferred embodiments, the covering foil can preferably have round, non-adhesive surfaces with an area in the range from ≥1.5 $mm^2$ to ≤45 $mm^2$, preferably in the range from ≥2.5 $mm^2$ to ≤8 $mm^2$, especially in the range from ≥3 $mm^2$ to ≤5 $mm^2$.

In also preferred embodiments, the covering foil can have non-adhesive areas with a width in the range from ≥5.8 mm to ≤6.6 mm, preferably in the range from ≥6.1 mm to ≤6.3 mm, and/or a length in the range from ≥5.8 mm to ≤6.6 mm, preferably in the range from ≥6.1 mm to ≤6.3 mm.

Preferably the covering foil is provided in form of a cutting suitable for a reaction vessel according to the SBS-standard. In preferred embodiments, a preferred cutting of the covering foil can have a width in the range from ≥76 mm to ≤84 mm, preferably in the range from ≥77 mm to ≤82 mm, especially in the range from ≥78 mm to ≤80 mm, and/or a length in the range from ≥130 mm to ≤160 mm, preferably in the range from ≥135 mm to ≤155 mm, especially in the range from ≥140 mm to ≤150 mm.

Preferably the length of the cuttings of the covering foil is longer than the length of a reaction vessel according to the SBS-standard. Preferably the cuttings have a non adhesive area on both sides in the length, preferably each with a length in the range from ≥5 mm to ≤12 mm, preferably in the range from ≥8 mm to ≤10 mm. This has the advantage that the covering foil can be better grasped on the longitudinal side and can be applied onto the reaction vessel with increased certainty.

In a further preferred embodiment, the covering foil including a polymer layer and an adhesive layer has a thickness in the range from ≥25 μm to ≤125 μm, preferably in the range from ≥50 μm to ≤100 μm, especially in the range from ≥65 μm to ≤70 82 m. This has the advantage that the covering foil can be easily poked through.

According to a preferred embodiment, the covering foil has on the side of the covering foil that is not covered with adhesives, markings which indicate the position of the adhesive-free surfaces and/or indicate the individual reaction chambers. For example, the designation of the individual reaction chambers can be given in mirror-reverse as well as also in the reading direction, this has the advantage that the designation of the individual reaction chambers can be read during the application of the sample droplets as well as during and/or after the application of the foil onto the reaction vessel. Furthermore, the marking of the position of the adhesive-free surfaces makes it possible to easily recognize the position of the often colorless crystals formed.

Preferably, the markings are made in the form of an imprint. The marking can also be applied onto the non-adhesive areas of the side of the covering foil which is provided with adhesive. In addition to a bare imprint, the marking can also be made by an embossing for example a raised border or by a recess.

The adhesive layer can be protected by a removable protective foil preferably by a removable silicone foil.

The present invention further relates to an arrangement for the application of a covering foil onto a reaction vessel, comprising a fastening device for a covering foil comprising a base structure for receiving the covering foil wherein the base structure has a footprint area preferably with a width in the range from ≥80 mm to ≤90 mm and a length in the range from ≥120 mm to ≤135 mm, wherein on at least two opposing sides of the base structure fastening components are applied with which the covering foil is attachable in a stretched manner to the base structure so that it can be stretched tight, and wherein the base structure preferably has in the corner areas at least two positioning elements, preferably recesses.

In an advantageous way, the fastening components make possible an attachment of the covering foil to the fastening device.

Surprisingly it could be determined that the fastening device makes it possible to affix a covering foil securely and then detachable again so that the covering foil can be pipetted without sliding. In particular, droplets of sample solution can be applied precisely onto selected areas of a slide-proof and secure covering foil.

The base structure is preferably a rectangular base structure. Preferably the base structure has an area that can be set onto a reaction vessel with a width in the range from ≥83 mm to ≤87 mm and a length in the range from ≥125 mm to ≤129 mm. Especially preferred, the base structure has a surface area which can be set onto a reaction vessel having SBS-standard format.

Preferably, the base structure has at least two side edge surfaces which are set apart at a distance such that the base structure can be mounted onto a reaction vessel with a width in the range from ≥83 mm to ≤87 mm, in particular of the SBS-standard.

Preferably the base structure has a footprint area with a width in the range from ≥83 mm to ≤87 mm and a length in the range from ≥125 mm to ≤129 mm, preferably with a width in the range from ≥84 mm to ≤86 mm and a length in the range from ≥126 mm to ≤128 mm. Preferably, the footprint area complies with the SBS-standard. The footprint area makes possible in an advantageous way that the fastening device can be positioned on common pipetting robots. Thus, a pipetting of liquid on a covering foil on a fastening device can also be done automatically as well as manually.

In a preferred embodiment, an elastically deformable mounting surface is attached to the base structure.

Preferably, the elastically deformable mounting surface can be connected to the base structure so that it can be separated. Preferably, the elastically deformable mounting surface can be mounted to the base structure so that it can be connected in an affixed way. In a preferred embodiment, the elastically deformable mounting surface can be mounted so that is can be affixed to the base structure.

The term "elastically deformable" is understood in the context of the present invention to mean that the mounting surface can be deformed when it is pressed upon and after the end of the applied pressure, it will return again to the non-deformed flat shape.

By the mounting surface being elastically deformable the mounting surface can easily be adapted to the spacers of a reaction vessel. This makes it possible for the fastening device to be used not only for a certain reaction vessel, but also for reaction vessels with varying design of the surface. For example, using the elastically deformable mounting surface, a foil can not only be mounted on the reaction vessels with varying width, but also on reaction vessels that do not necessarily have to have a flat surface.

In an advantageous way, the elastically deformable mounting surface makes it possible to uniformly adhere the covering foil onto a reaction vessel in a planar arrangement after pipetting. In particular, a uniform adhering or pressing of a foil that is designed to be adhesive onto a reaction vessel or a non-adhesive foil is made possible by a reaction vessel that is provided with adhesive surface areas.

The elastically deformable mounting surface can be made from an elastomer, in particular a thermoplastic elastomer, silicone, or rubber. Principally suitable in addition to plastic are other materials that are elastically deformable after they have been pressed flat. Preferably, the elastically deformable mounting surface has a thickness in the range from ≥0.5 mm to ≤2 mm, preferably in the range from ≥1.3 mm to ≤1.5 mm.

The width of the elastically deformable mounting surface is preferably in the range from ≥75 mm to ≤87 mm, preferably in the range from ≥77 mm to ≤85 mm, especially in the range from ≥78 mm to ≤80 mm, and/or the length is in the range from ≥100 mm to ≤150 mm, preferably in the range from ≥115 mm to ≤140 mm, especially in the range from ≥120 mm to ≤135 mm.

Onto the fastening device, fastening components are mounted on at least two opposing sides of the base structure with which the covering foil can be stretched tight in attachment onto the base structure.

Preferably, the covering foil is attachable in a stretched and detachable manner onto the base structure. After the application of the sample solution onto the foil affixed to the base structure, it can be detached again from the base structure. The mounting can be made possible by suitable fastening components.

Preferably, the fastening components are mounted onto the front sides of the base structure. However, it can also be provided that fastening components are mounted onto the longitudinal sides.

Preferred fastening components are selected from the group comprising hangers, loops, flaps, bands, spring elements and/or sliding fastening components.

Preferably, the fastening components are set in bearings so that they can rotate by a hinged connection. In an especially preferred embodiment, the fastening components can be set on an axle so that they can rotate. Preferred fastening components are mounting plates that are set on an axle so that they can rotate.

In another preferred embodiment, the fastening components can be slidable fastening components which can fix the foil from the side or from above. In yet another embodiment, the fastening components can be hangers, loops, flaps, bands, or spring elements, in particular hangers, loops, flaps, bands, or spring elements that are affixed to the base structure.

It can be preferred that the fastening components are spring elements that are affixed to the base structure. This makes it possible that the foil can be affixed by it being able to slide under the spring elements that are affixed to the base structure.

In preferred embodiments, the foil is affixed by it being placed on the mounting surface. The fastening components, preferably mounting plates set in bearings so that they can rotate on an axle can be opened for this purpose, for example, by folding them open.

Preferably, the fastening components can be locked in the opened position. This can prevent an undesired slamming shut of the fastening components, for example, plates. According to a preferred embodiment, the fastening components can be locked in the opened position by press pins.

After the foil is placed, the fastening components, preferably mounting plates set in bearings so that they can rotate on an axle, can be closed shut. Preferably the foil can be clamped fixed by closed plates on the base structure.

Preferably, the fastening components can be locked in closed position. This can prevent an undesired opening of the fastening components, e.g. the plates. According to a preferred embodiment, the fastening components can be locked in a closed position by magnets that are located in the base structure and in the fastening components.

In a preferred embodiment, the fastening components can be locked in an open position by press pins and/or the fastening components can be locked in a closed position by magnets located in the base structure and in the fastening components.

A "closed position" is understood in the context of the present invention to be the position in which a covering foil is affixed by fastening components in the fastening device. Preferably, the fastening components, e.g. mounting plates set in bearings on an axle, are closed in the process. An "open position" in the context of the present invention is understood to be the position in which a covering foil is not affixed by the fastening components in the fastening device. Preferably in the process the fastening components, e.g. mounting plates set in bearings on an axle, are opened.

According to a further preferred embodiment, the fastening components can be locked by a spring system, e.g. a dead-center spring.

The fastening device has at least two positioning elements. The at least two positioning elements are preferably mounted on opposing sides of the fastening device. In a preferred way, the fastening device has four positioning elements preferably arranged symmetrically to each other. The positioning elements are preferably provided on two positions of the base structure. Preferably, the positioning elements are mounted in corner areas of the base structure.

The positioning elements of the fastening device can be recesses or raised areas such as pins or projections. The positioning elements of the fastening device are preferably recesses. This allows an unhindered positioning of the foil and in particular, an unhindered application of a liquid onto the positioned covering foil.

In preferred embodiments, the positioning elements, preferably recesses have a diameter in the range from ≥4.2 mm to ≤8.2 mm, preferably in the range from ≥4.7 mm to ≤7.2 mm, especially in the range from ≥5.2 mm to ≤6.2 mm. In additional preferred embodiments, the recesses are through-holes.

The fastening device with the covering foil, on which sample solution was pipetted, can be turned around and placed on a reaction vessel. Then, by pressing using the elastically deformable mounting surface, the adhesive layer of the covering foil can be adhered onto the reaction vessel. After the foil is stuck onto the reaction vessel, the mounting plates can be detached and the fastening device can be easily lifted out.

It is preferred that setting the covering foil on a reaction vessel is done using a receiving device for a reaction vessel. This has the advantage that the placement can be done in a directed way.

The arrangement according to the invention for the application of a covering foil onto a reaction vessel comprises at least one fastening device for a covering foil.

The arrangement according to the invention for the application of a covering foil onto a reaction vessel comprises more preferred a receiving device for a reaction vessel wherein on the base structure of the receiving device at least two positioning elements, preferably pin-type positioning elements are arranged, and wherein the dimensions of the recess are such that a reaction vessel with a width in the range from ≥80 mm to ≤90 mm, preferably with a width in the range from ≥83 mm to ≤87 mm, especially with a width in the range from ≥84 mm to ≤86 mm can be positioned in the recess.

The receiving device has at least two positioning elements. The at least two positioning elements are preferably mounted on opposite sides of the receiving device. In a preferred way, the receiving device has four positioning elements preferably arranged symmetrically to each other. Preferably, the positioning elements are mounted in the corner areas of the base structure of the receiving device.

The positioning elements of the receiving device can be raised areas such as pin-type elements, in particular pins or projections, or recesses. The positioning elements of the receiving device are preferably pin-type positioning elements.

The positioning elements of the fastening device, preferably recesses, can interact, preferably with the positioning elements of the receiving device, preferably raised areas such as pins. In preferred embodiments of the receiving device, the at least two positioning elements, preferably pin-type positioning elements, can be made to mesh with the positioning elements, preferably recesses, of the fastening device according to the invention.

In preferred embodiments, the positioning elements, preferably pin-type positioning elements, have a length in the range from ≥25 mm to ≤40 mm, preferably in the range from ≥28 mm to ≤38 mm, especially in the range from ≥30 mm to ≤35 mm. In additional preferred embodiments, the positioning elements, preferably pin-type positioning elements, have a diameter in the range from ≥4 mm to ≤8 mm, preferably in the range from ≥4.5 mm to ≤7 mm, especially in the range from ≥5 mm to ≤6 mm.

According to another embodiment, the fastening device can be positioned with the aid of guide rails along the outer surfaces of the fastening device on or in the recess device.

The positioning using pin-type positioning elements, in particular, pins which can be brought into mesh with the recesses of the fastening device, or guide rails, has the great advantage that the foil can be mounted on the reaction vessel in a directed manner. In particular, the pins or the guide rails allow the positioned foil to be mounted onto a reaction vessel correspondingly positioned in a receiving device so that the surfaces of the foil that are free of adhesive and covered with drops can be positioned with essentially greater precision above the reaction chambers than is possible without an auxiliary mechanism.

In a preferred way, the dimensions of the recess are square shaped. Preferably, the dimensions of the recess are such that a reaction vessel can be set into the recess with SBS-standard format.

Into the recess of the receiving device, a reaction vessel can be positioned preferably with SBS format. After drops of the sample solution have been brought onto the covering foil, the fastening device with the covering foil can be turned over and set onto the receiving device. In this process, for example, pins of the receiving device mesh into corresponding recesses of the fastening device. Thus, the position of the reaction vessel and the foil are coordinated to each other.

The foil can be pressed onto the reaction vessel located in the receiving device, whereby the elastic mounting surface of the foil can provide a uniform distribution of the force and thus a uniform adhesion. Then, the fastening components for example plates can be opened and the fastening device lifted off. The reaction vessel closed with the foil can be taken out of the plate receptacle.

In preferred embodiments, an arrangement for the application of a covering foil on a reaction vessel comprises a fastening device according to the invention for a covering foil and a receiving device according to the invention for a reaction vessel.

It is preferred that the arrangement according to the invention for the application of a covering foil onto a reaction vessel is made out of a polymer material.

Preferred polymers are selected from the group comprising polyoxymethylene (POM), polymethylmethacrylate (PMMA) and/or polypropylene.

This makes it possible that the device is easy to clean. However, it can also be preferred that the device is made of metal or partially out of metal. Preferred metals are selected from the group comprising special steel, in particular stainless steel and/or aluminum. Aluminum is preferably anodized or provided with a surface coating, preferably a varnish, in particular clear varnish, especially duroplastic cured varnish.

The present invention relates furthermore to a system comprising a reaction vessel according to the invention and a covering foil. Preferably, the system comprises a reaction vessel according to the invention and a covering foil mounted onto the reaction vessel. It is advantageous that the reaction vessel according to the invention can be used with any suitable covering foil for covering the reaction chambers. Preferably, the covering foil is a covering foil according to the invention.

For the reaction vessel and the covering foil according to the invention, reference is hereby made in full extent to the previous description.

The present invention relates furthermore to a system comprising a reaction vessel, a covering foil and an arrangement according to the invention for the application of a covering foil onto a reaction vessel.

It is advantageous that the arrangement according to the invention for the application of a covering foil onto a reaction vessel can be used with any suitable reaction vessel with SBS-standard format.

Reference is thus made in full extent to the previous description for the arrangement according to the invention for mounting a covering foil.

Additional details, characteristics, and advantages of the object of the invention can be gathered from the subordinate claims and the following description of the corresponding drawings and examples, in which for example, embodiment examples of the present invention are depicted.

Figure 1:
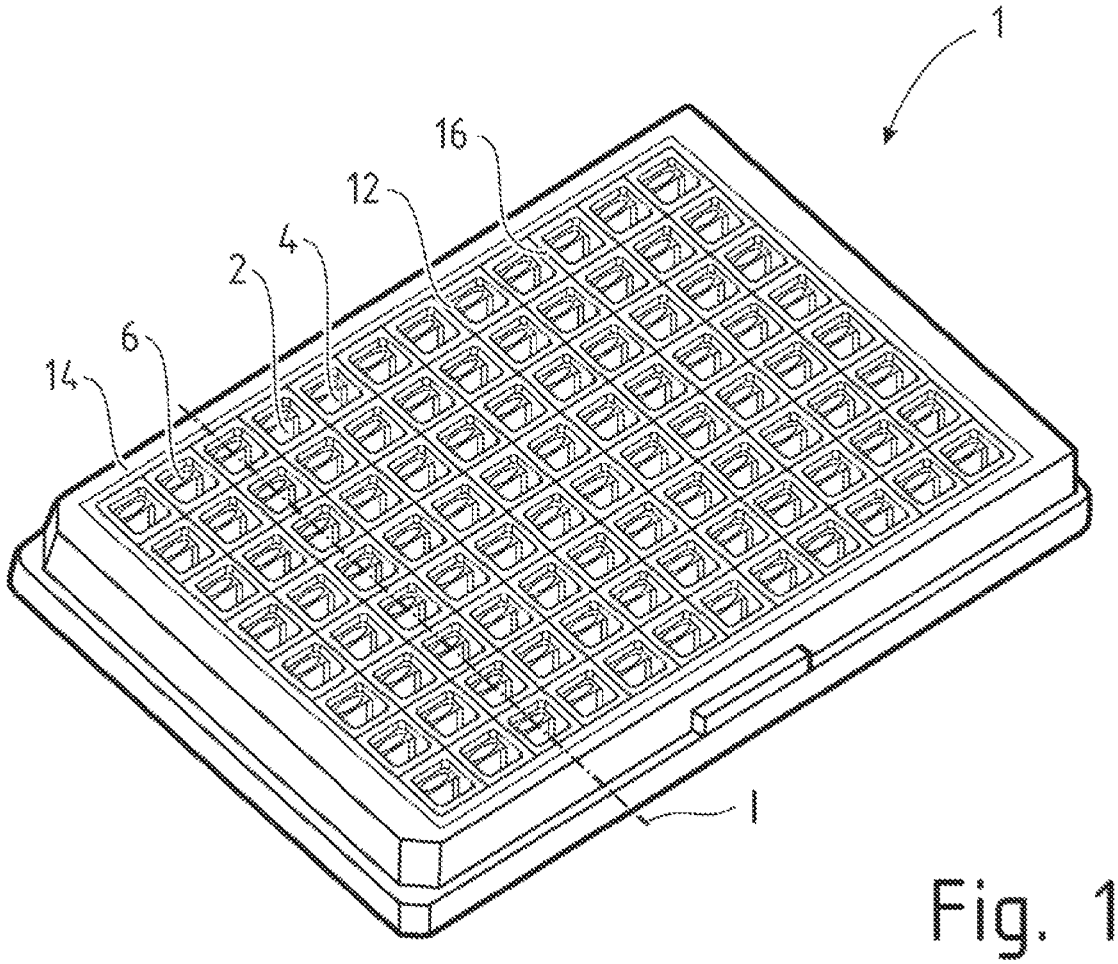
FIG. 1 shows a schematic view of a reaction vessel according to the invention according to an embodiment example of the invention.

FIG. 1 shows a schematic view of a reaction vessel according to the invention for crystallization of a sample from a solution according to an embodiment example. The reaction vessel 1 comprises several reaction chambers 2. In the reaction chamber 2, a reservoir 4 and a crystallization space 6 are located. The crystallization space 6 is in the form of an elliptically constructed recess. The crystallization space is arranged on a step in the reaction chamber 2. The side walls of the reaction chambers 2 are connected to each other via the connection spacers 12. In this way, the connection spacers 12 form, with the sideways circumferential surfaces 14 of the reaction vessel 1, a common flat surface. The connection spacers 12 have a groove 16 in the middle.

Figure 2:
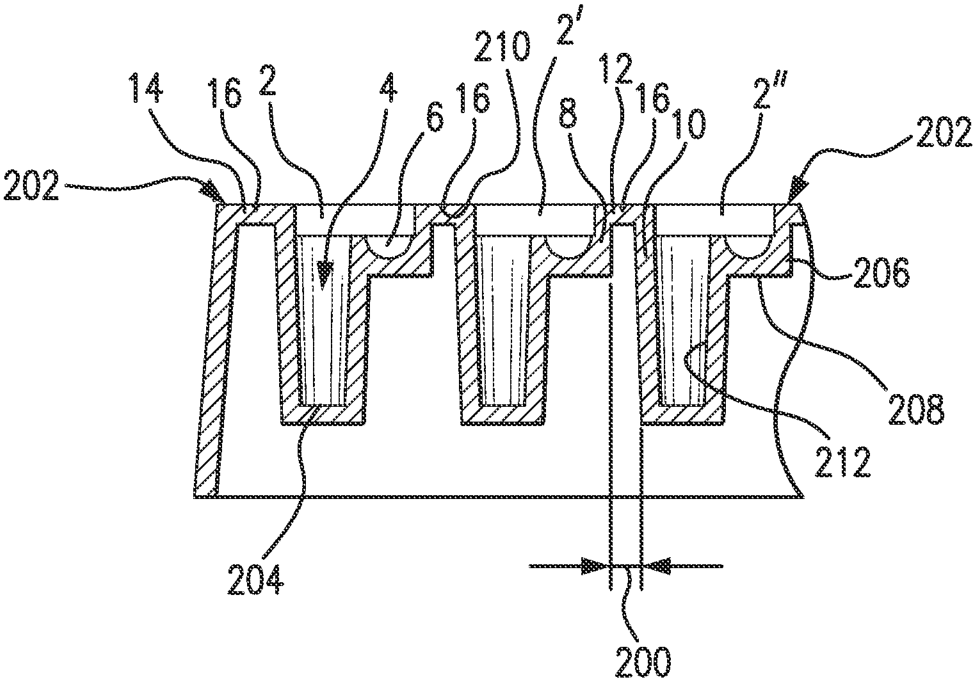
FIG. 2 shows a section view of a reaction vessel according to the invention based on FIG. 1 along the axis I.

The section view of the reaction vessel according to the invention shown in FIG. 2 based on FIG. 1 along axis I shows clearly that the connection spacers 12 form a flat surface with the sideways circumferential surfaces 14 of the reaction vessel 1. Here, the connection spacers 12 connect a first side wall 8 of a first reaction chamber 2 with a second side wall 10 of a second reaction chamber 2 that is set off at a distance from it. The step, on which the crystallization space 6 is arranged, has a flat surface on the underside below the crystallization space.

The side walls of the reaction chamber 2 are connected to each other via connection spacers 12 which form a flat surface with the sideways circumferential surfaces 14 of the reaction vessel 1. Correspondingly, the connection spacers 12 also connect, along an axis perpendicular to the axis I shown, a first side wall, which is perpendicular to the side wall 8, of a first reaction chamber 2, to a second side wall, which is set apart at a distance from it and is perpendicular to the side wall 10, of a second reaction chamber 2.

Figure 3:
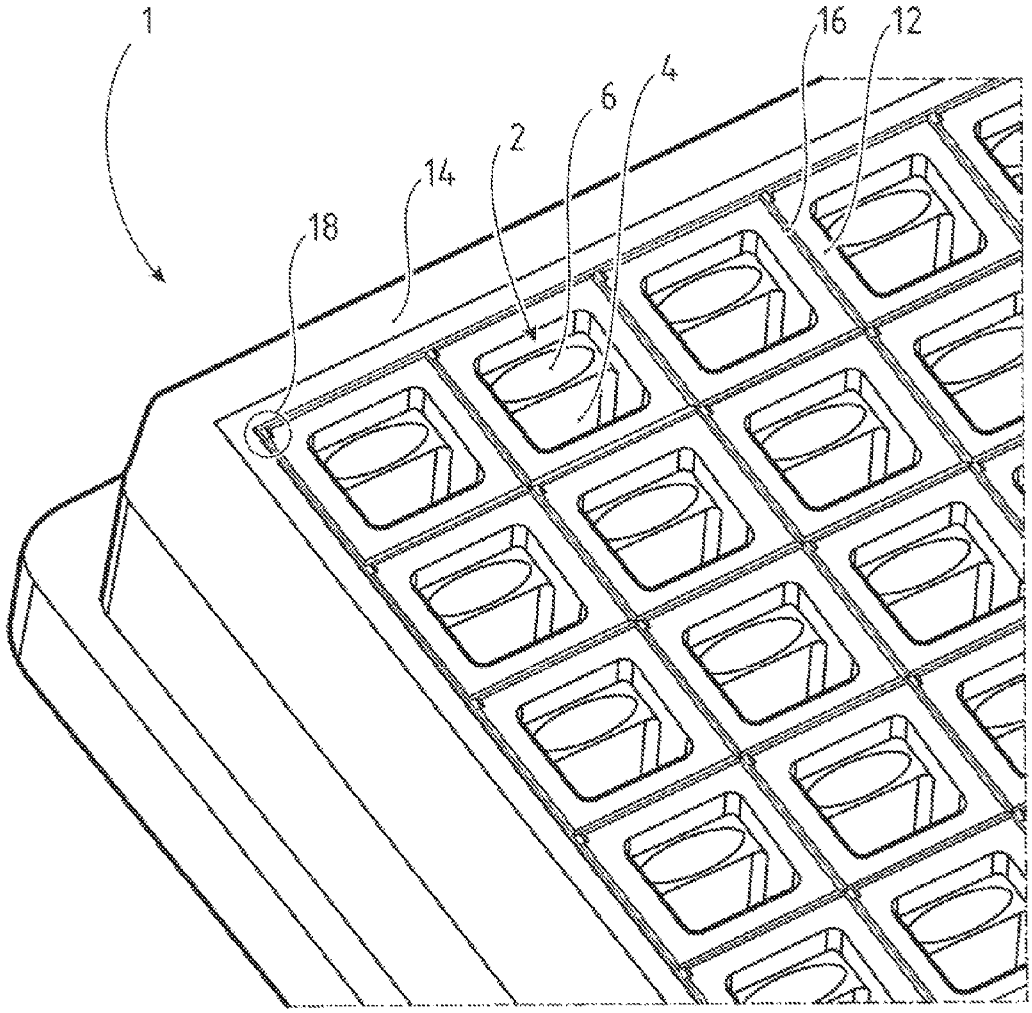
FIG. 3 shows an enlarged schematic view of a reaction vessel according to the invention according to FIG. 1.

FIG. 3 shows an enlarged schematic view of the reaction vessel according to the invention according to FIG. 1. The connection spacers 12 have a recess 18 in a corner of a reaction chamber 2.

Figure 4:
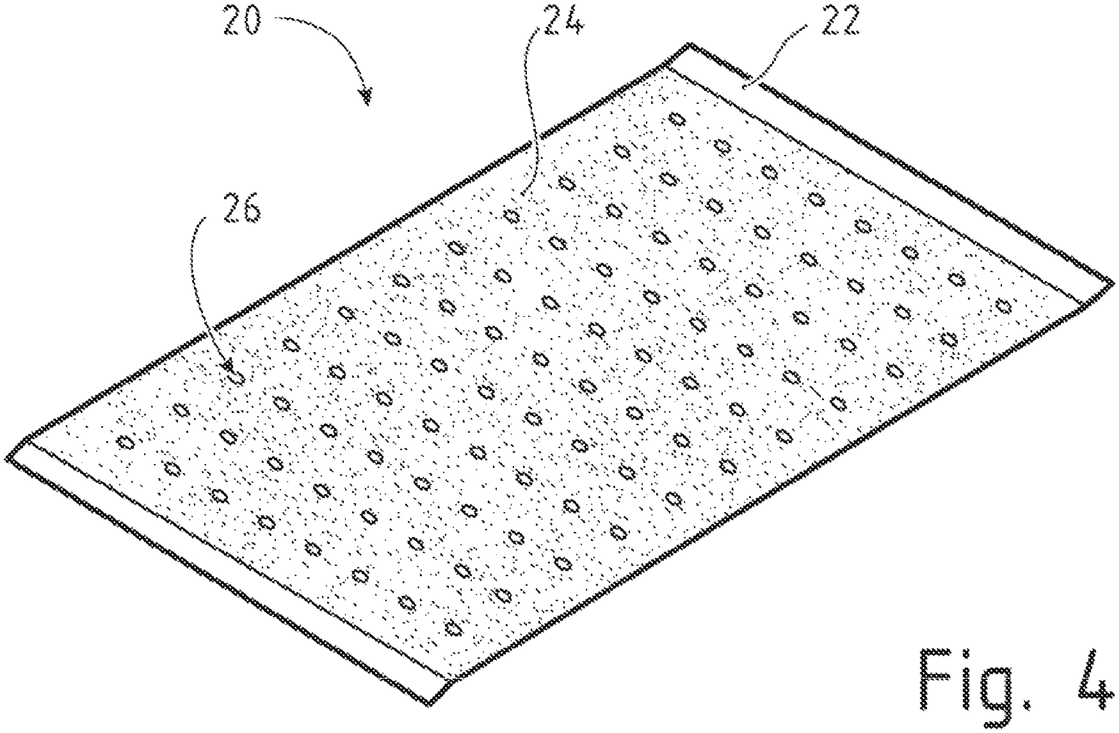
FIG. 4 shows a schematic view of a covering foil according to the invention according to an embodiment example of the invention.

FIG. 4 shows a schematic view of a covering foil according to the invention according to an embodiment example of the invention. The covering foil 20 comprises a polymer layer 22 on which an adhesive is applied. Within the adhesive layer 24, are areas 26 that are free of adhesive. Within these areas 26, a sample drop can be applied. Furthermore, the covering foil 20 has, on both sides in the length an adhesive-free area of the polymer layer 22. This has the advantage that the covering foil 20 can be better grasped on the area of the polymer layer 22 that is free of adhesive.

Figure 5:
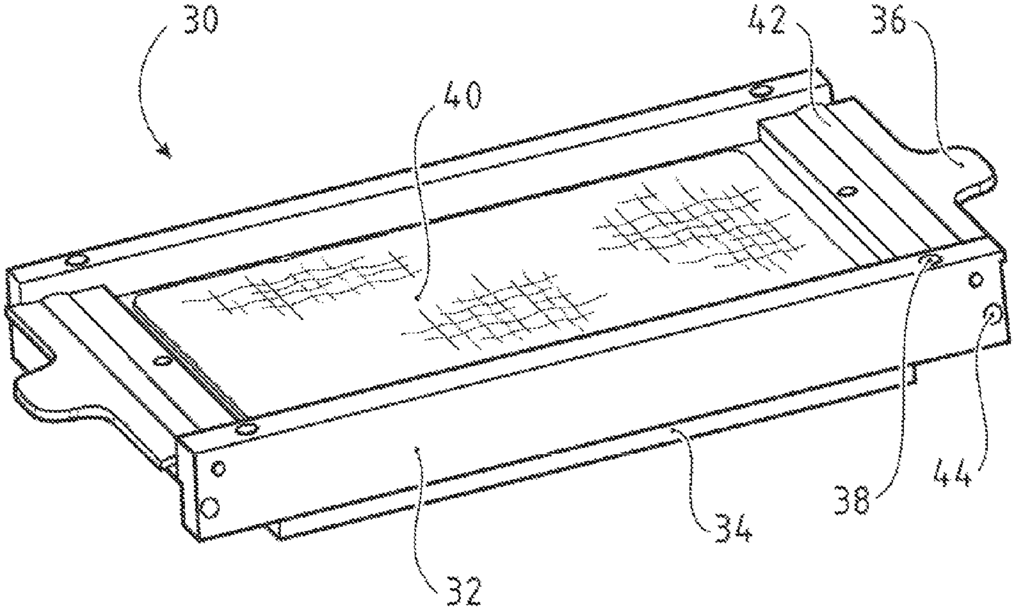
FIG. 5 shows a schematic view of a fastening device according to the invention according to an embodiment example of the invention.

FIG. 5 shows a schematic view of a fastening device 30 according to the invention according to an embodiment example of the invention. The fastening device 30 has a base structure 32 for receiving the covering foil. On the base structure, an elastically deformable mounting surface 40 is affixed. Furthermore, the base structure 32 has a footprint area 34 with a width in the range from ≥84 mm to ≤86 mm and a length in the range from ≥126 mm to ≤128 mm. On the face sides of the base structure 32, mounting plates 36 are attached with which the covering foil is stretched tight and attached to the base structure so that it is detachable. The mounting plates 36 are set in bearings on an axle 42 so that they can rotate. In the closed position (shown) the mounting plates 36 are locked by magnets inserted into the base structure and the fastening components 36. In addition, the base structure 32 has recesses 38 in the corner regions.

Figure 6:
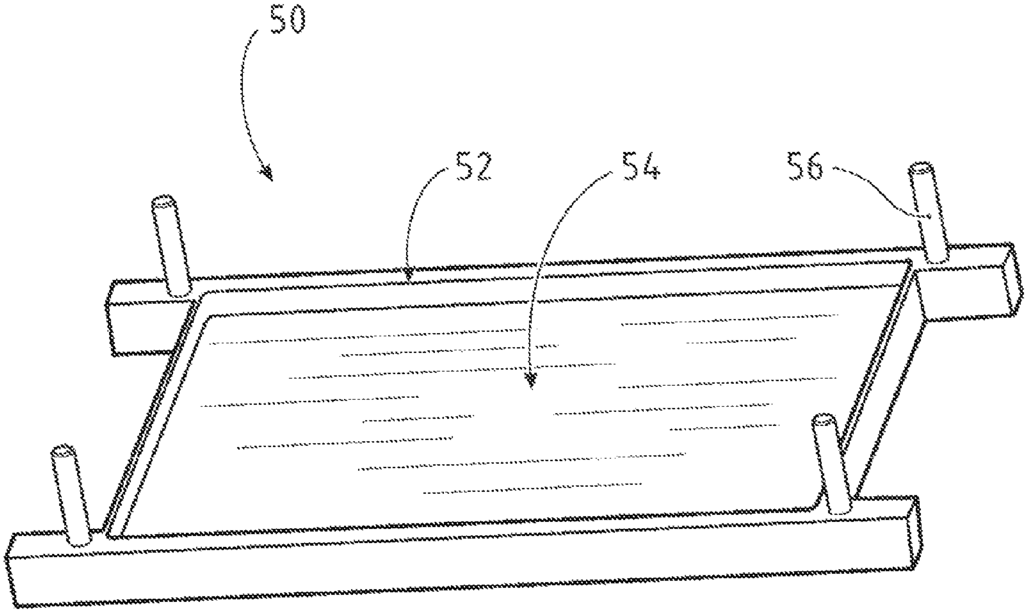
FIG. 6 shows a schematic view of a receiving device according to the invention according to an embodiment example of the invention.

FIG. 6 shows a schematic view of a receiving device according to the invention according to an embodiment example of the invention. The receiving device 50 comprises a base structure 52 with a recess 54. Here, the dimensions of the recess 54 are made so that a reaction vessel with SBS-standard format can be positioned in the recess 54.

Furthermore, the receiving device 50 has pins 56 in the corner areas of the receiving device 50 which can be brought into mesh with recesses 38 of the fastening device.

The invention claimed is:

1. A multi-chamber crystallization plate for crystallization of a sample from a solution, the multi-chamber crystallization plate comprising:

a) a plurality of reaction chambers, each reaction chamber of the plurality of reaction chambers comprising:
   i) a reservoir comprising a first sidewall, a second sidewall, and a floor connecting the first sidewall and the second sidewall; and
   ii) a ledge formed between an internal surface of the first sidewall and an external surface of the first sidewall, the ledge arranged above the floor of the reservoir, the ledge comprising a crystallization space formed in the ledge, wherein the crystallization space and the reservoir are in fluid communication with each other;

b) a flat planar surface comprising a sideways circumferential surface and a plurality of connection spacers, the sideways circumferential surface encircling the plurality of reaction chambers;

c) the plurality of connection spacers connecting adjacent first sidewalls and second sidewalls of adjacent reaction chambers of the plurality of reaction chambers; and d) the plurality of connection spacers each comprising a groove having a depth that extends below the flat planar surface.

2. The multi-chamber crystallization plate according to claim 1, wherein the plurality of connection spacers each have a width in the range of ≥1.5 mm to ≤5 mm.

3. The multi-chamber crystallization plate according to claim 1, wherein each of the grooves is in a center of each of the connection spacers.

4. The multi-chamber crystallization plate according to claim 1, wherein each of the grooves has a width in the range from ≥0.2 mm to ≤0.7 mm and/or the depth in the range from ≥0.05 mm to ≤0.5 mm.

5. The multi-chamber crystallization plate according to claim 1, wherein each crystallization space is an elliptical recess.

6. A system comprising a multi-chamber crystallization plate according to claim 1 and a covering foil.

7. The multi-chamber crystallization plate according to claim 1, wherein each of the connection spacers has a width in the range of ≥2 mm to ≤4 mm.

8. The multi-chamber crystallization plate according to claim 1, wherein each of the connection spacers has a width in the range of ≥2.5 mm to ≤3 mm.

9. The multi-chamber crystallization plate according to claim 1, wherein each of the grooves has a width in the range from ≥0.3 mm to ≤0.6 mm, and/or the depth in the range from ≥0.1 mm to ≤0.4 mm.

10. The multi-chamber crystallization plate according to claim 1, wherein each of the grooves has a width in the range from ≥0.4 mm to ≤0.5 mm and/or the depth in the range from ≥0.2 mm to ≤0.3 mm.

* * * * *